United States Patent [19]
Obermiller et al.

[11] Patent Number: 5,431,384
[45] Date of Patent: Jul. 11, 1995

[54] METHOD AND APPARATUS FOR FEEDING PRINT MEDIA

[75] Inventors: Margaret A. Obermiller, Ipswich; Charles W. Triggs, Marshfield, both of Mass.

[73] Assignee: Polaroid Corporation, Cambridge, Mass.

[21] Appl. No.: 240,245

[22] Filed: May 10, 1994

[51] Int. Cl.⁶ .............................................. B65H 5/08
[52] U.S. Cl. ........................................... 271/11; 271/95
[58] Field of Search ............... 271/11, 12, 95, 103, 271/276

[56] References Cited

U.S. PATENT DOCUMENTS

| | | | |
|---|---|---|---|
| 3,025,052 | 3/1962 | Gutteling | 271/28 |
| 3,127,167 | 3/1964 | Rabinow et al. | 271/27 |
| 3,806,114 | 4/1974 | Carter | 271/20 |
| 4,345,752 | 8/1982 | Nakamura et al. | 271/12 |
| 4,568,073 | 2/1986 | VanHorne | 271/11 |
| 4,666,145 | 5/1987 | Blümle | 271/276 |
| 4,739,982 | 4/1988 | Hain | 271/94 |
| 4,802,662 | 2/1989 | Hobbelt et al. | 271/20 |
| 5,232,213 | 8/1993 | Parsons et al. | 271/95 |

FOREIGN PATENT DOCUMENTS

| | | | |
|---|---|---|---|
| 278131 | 4/1912 | Germany | 271/95 |
| 335711 | 8/1919 | Germany | 271/95 |
| 1139851 | 11/1962 | Germany | 271/29 |
| 288604 | 5/1953 | Switzerland | 271/95 |

*Primary Examiner*—H. Grant Skaggs
*Attorney, Agent, or Firm*—Leslie Payne

[57] ABSTRACT

An apparatus and method for feeding single sheets of laminated thermographic print media are disclosed. The apparatus includes a traveling vacuum roller reciprocatable between pickup and discharge positions under suitable control so as to engage an end of the sheet near the pickup end and roll the sheet thereabout to a selected first angular position and then releasing the sheet end at such position. The vacuum roller continues to engage the sheet and applies a vacuum to engage the other end of the sheet so as to carry it to a second angular position and then releasing the sheet by releasing the vacuum as the roller approaches the discharge position. A wrapping roller engages the vacuum roller for directing the end of the rolled sheet towards the discharge after releasing it. A lift mechanism near the discharge position lifts the vacuum roller as it approaches the discharge.

45 Claims, 4 Drawing Sheets

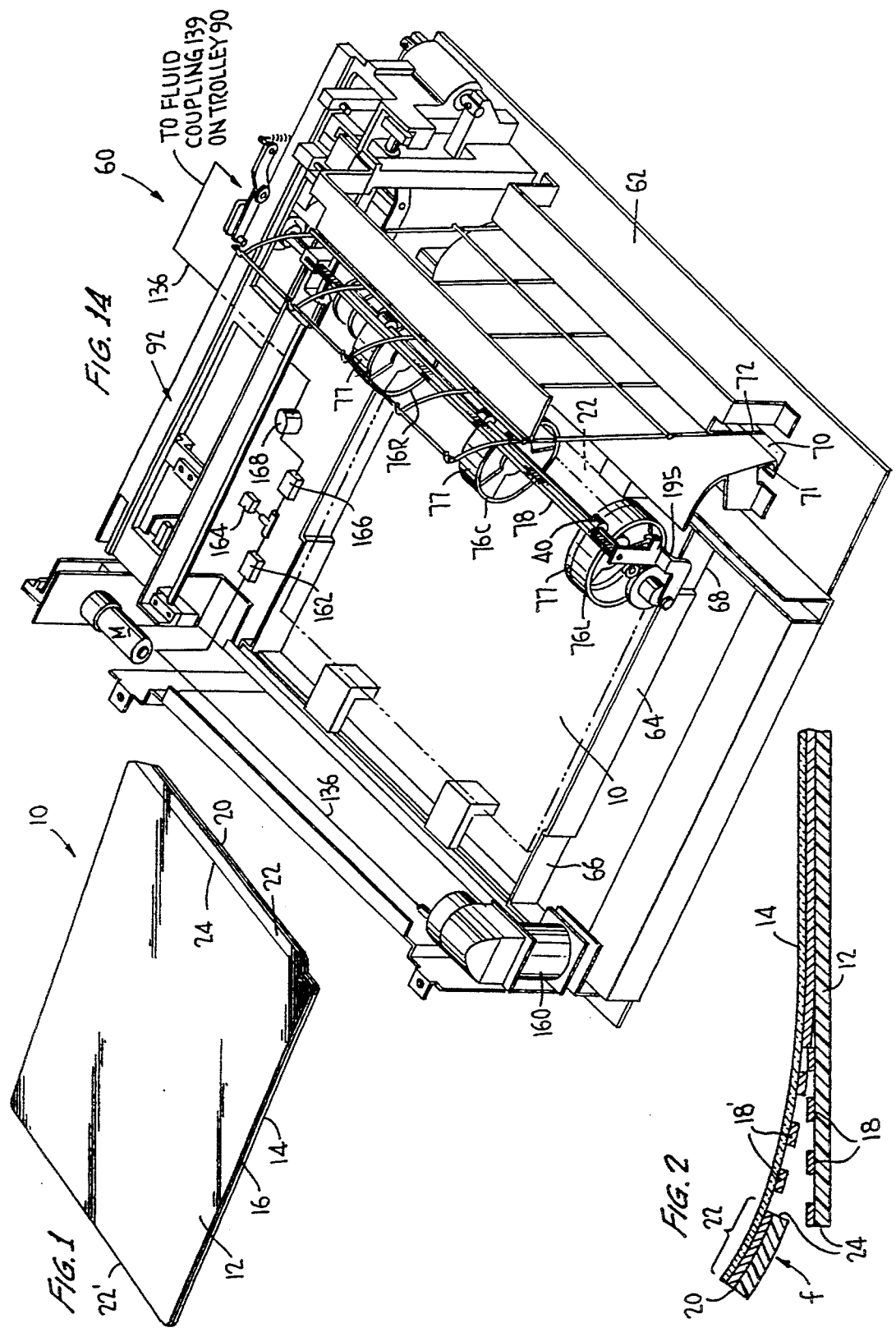

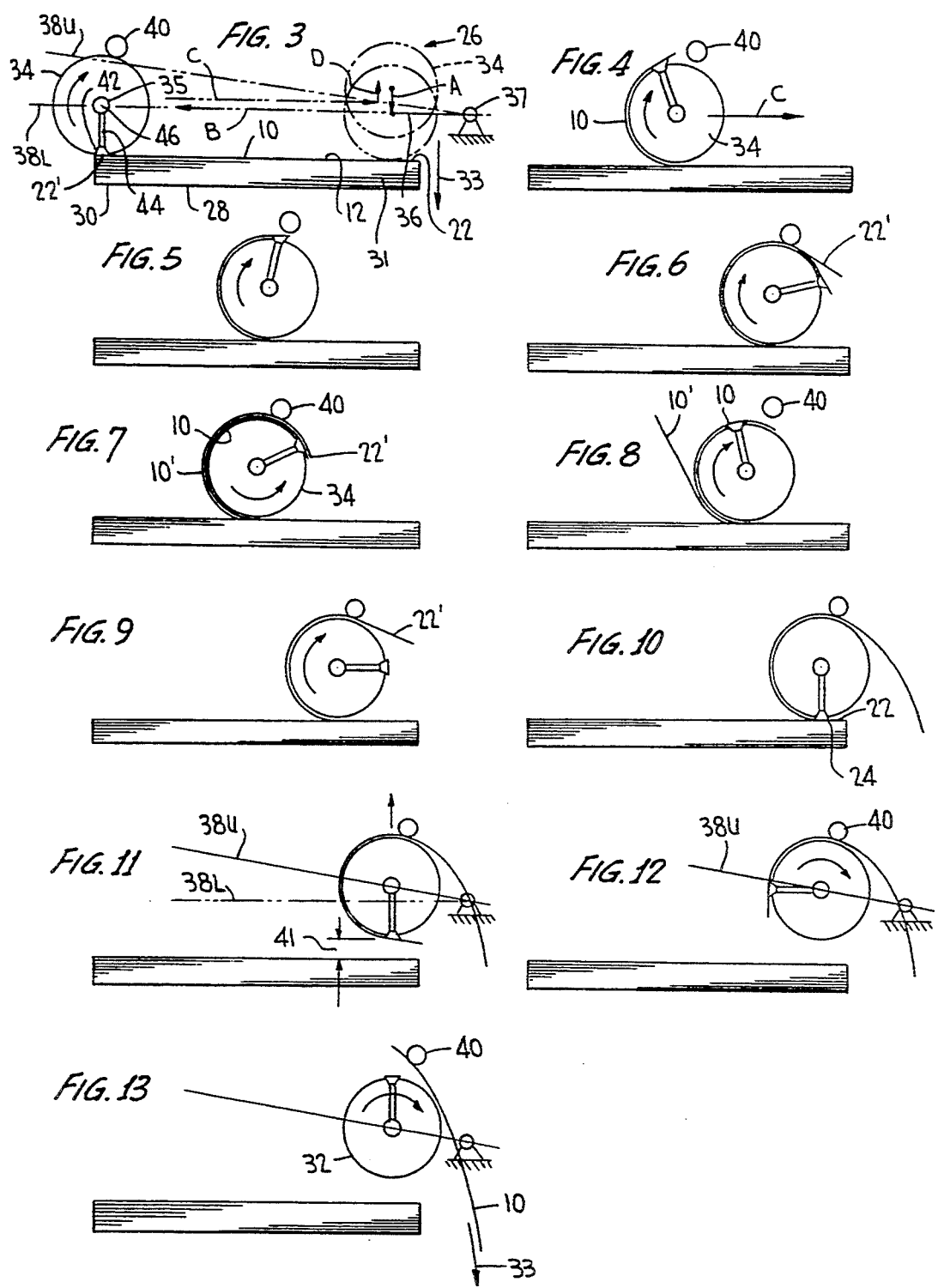

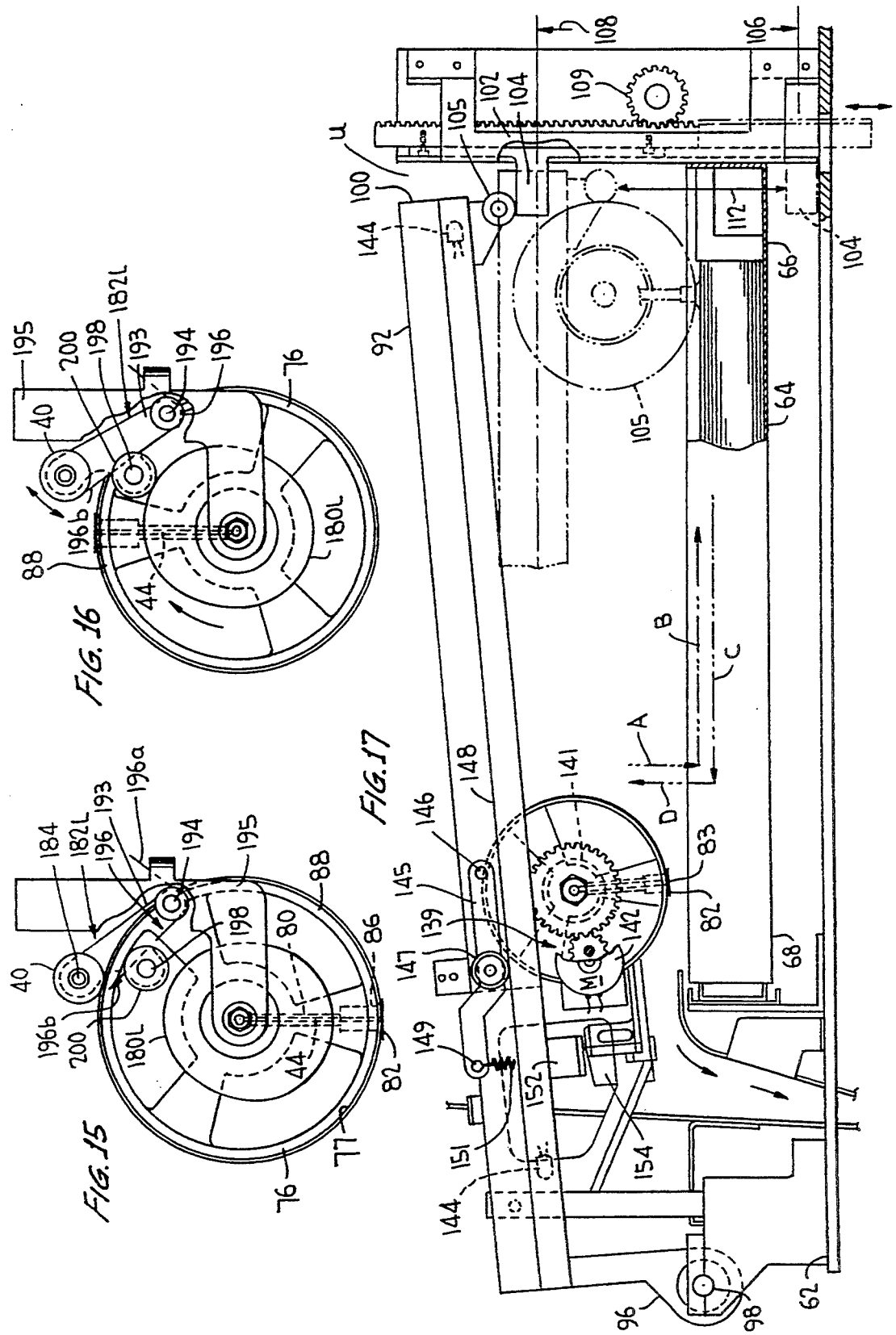

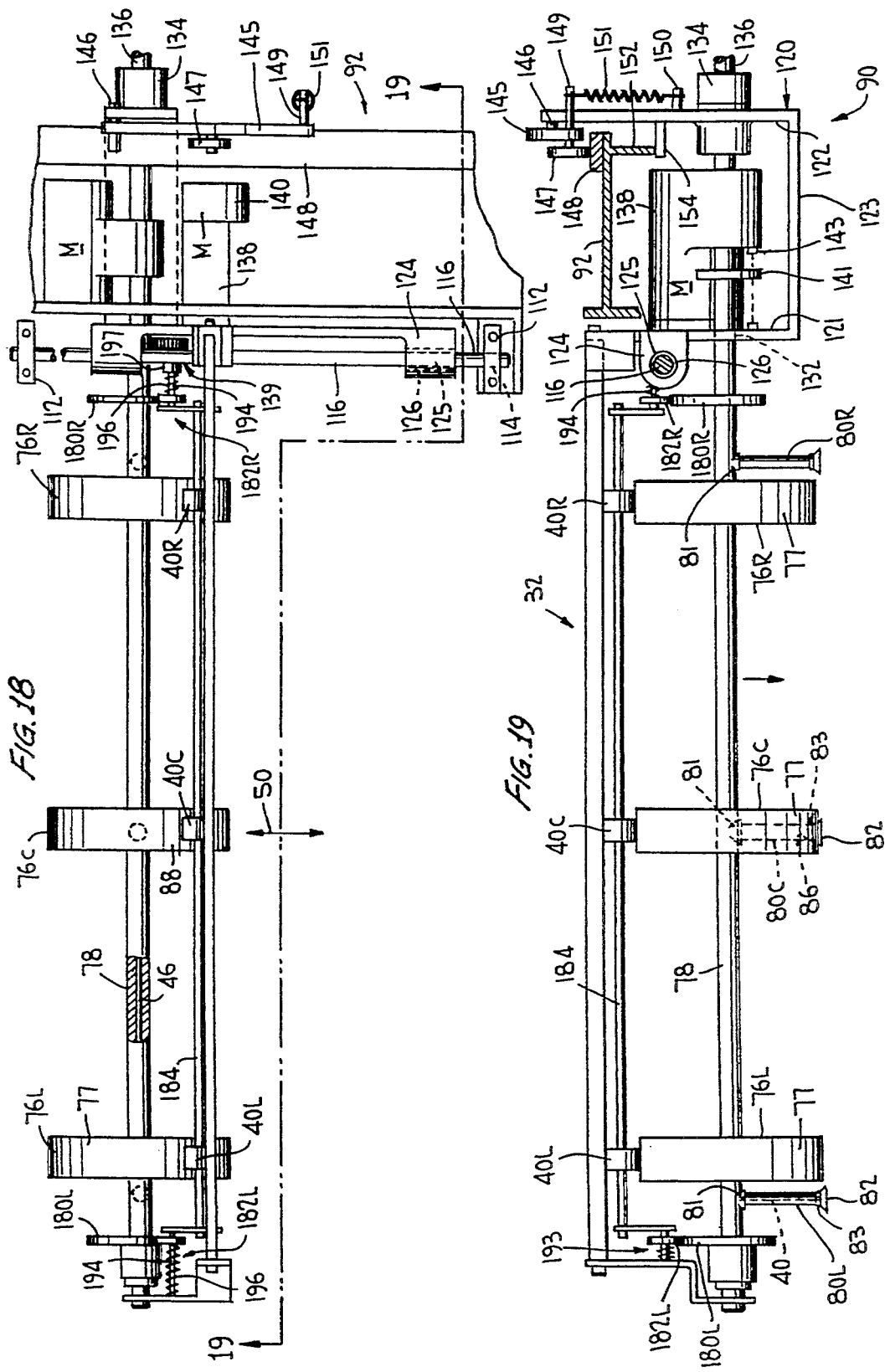

METHOD AND APPARATUS FOR FEEDING PRINT MEDIA

BACKGROUND OF THE INVENTION

The invention relates to a sheet feeding apparatus and method. It particularly relates to a method and apparatus for singulating relatively stiff thermographic print media employing a traveling vacuum roller mounted on an outrigger trolley employing a single row of vacuum cups. The arrangement is designed to accomplish feeding of a single sheet of media such as film from a stack of such media without significant relative motion between the sheets that could produce scratching.

Themographic print media is fabricated from a laminate of a substrate, an overlying laminated disposable peel sheet and an intermediate multicomponent image layer of image forming material including adhesives joining the substrate and peel sheet. The substrate has a frangible substrate tab portion formed along a score line, formed in a free surface of the substrate adjacent a marginal edge of the media. The media is difficult to handle for a number of reasons. The material while being pliable is relatively stiff and thus conventional methods for singulating and transporting the material are either impractical or ineffective since the flexed sheets tend to return to their unflexed condition. Also, the tab portion is designed to snap or break along the score line to separate the substrate from the peel sheet. However, until such time as the peeling operation is to be effected, it is important that the laminate remain intact.

There are a number of known methods for feeding single sheets of paper or like media from one location to another. These devices often move one sheet relative to another. This is not a particular concern with paper or other relatively durable media for which surface quality is important but not crucial. However, film media and especially thermographic print media are less pliable than paper, are delicate and require great care in handling, otherwise surface scratches will develop which can adversely effect image resolution. The same fine defect free surfaces necessary for fine resolution, result in interactive forces, e.g., mechanical, chemical and electrical in origin which cause the media when stacked to tend to stick to adjacent sheets, thereby making singulation of such media difficult.

SUMMARY OF THE INVENTION

The present invention is based upon the discovery that laminated thermographic print media may be readily singulated and transported from a supply to a downstream sheet handling apparatus by means of a traveling vacuum roller assembly mounted on a cantilevered beam or outrigger assembly. The vacuum roller, vacuum orifices, and a valve for selectively applying vacuum during various stages of the process are operated for singulating and transporting the sheet towards a discharge end.

The vacuum orifices may be arranged in a single row and are sequentially operated to pick-up the leading and trailing ends of the sheet. Also a single vacuum source may be employed to simplify control.

In various embodiments, a wrapping roller is employed to secure the film to the travelling vacuum roller. The wrapping roller may be employed to produce a small amount of relative motion between extra adhered sheets to cause the sheets to separate without damaging the pristine surface of the media. The wrapping roller may also be employed to direct the media to the discharge.

In a particular embodiment, the invention is directed to an apparatus for preferably single sheet feeding, in a direction of sheet feed travel to a discharge, sheets of thermographic print media formed of a thermally sensitive laminate including a substrate and an overlying laminated disposable peel sheet joined to the substrate by a multicomponent thermally sensitive adhesive and image forming layer. The substrate has a frangible tab located along a score line formed in a free surface adjacent a marginal edge of the media. The apparatus employs a sheet retaining means having an open top and opposite ends transverse to the direction of feed travel for receiving a stack of sheets therein. The free surface of the substrate faces outwardly with the tab at one end transverse to the direction of the sheet feed travel. A trolley mounted film transport means reciprocates between a film pickup position and a film discharge position at opposite ends of the sheet retaining means. The trolley is arranged with a vacuum roller assembly disposed transverse to the direction of sheet feed travel for engaging the sheet near the non-tab end at the pickup position and rolling the sheet thereabout with the non-tab end leading. The roller releases the leading end at a first angular position and thereafter applies vacuum to the sheet near the discharge end and adjacent the tab. A lifter raises the roller to allow clearance for the tab and carries the sheet thereabout to a second angular position. The vacuum roller then releases the sheet into a discharge at the discharge end.

In another embodiment, the vacuum roller assembly is secured at one end on a trolley which rides on a pivot arm located adjacent the sheet retaining means. The pivot arm extends between the pickup and discharge ends and is adapted to pivot or rotate about an axis transverse to the direction of travel for lifting the trolley and attached roller near the discharge end. The trolley is rotatably suspended from the pivot arm on a support generally aligned with the direction of travel. A spring biased moment arm applies a force to the trolley for urging the vacuum roller assembly in the direction of the stacked sheets in such a manner so as to facilitate generally uniform redistribution of such forces on the sheet and thus facilitate uniform engagement of the vacuum roller across the stacked sheets. A uniform distribution of force will prevent undesired shifting and possible damage to the media occasioned by such shifting and ensures contact between the vacuum orifices and the media.

The vacuum roller assembly may include a plurality of spaced apart rollers mounted on a shaft and a plurality of radial members extending from a shaft either through or adjacent the rollers for engaging the media. The radial members and the shaft have a vacuum passageway for applying the vacuum to the sheets so as to facilitate sheet singulation.

The vacuum roller assembly includes a wrapper roller assembly which is spring biased into engagement with the vacuum roller and the rolled sheet to secure the sheet on the vacuum roller when vacuum is not applied to the sheet. The wrapping roller can be caromed away from any sheets on the vacuum roller and the latter can be counterrotated so as to assist in the removal of any clinging additional sheets that may have been picked up.

In still other embodiments, the vacuum roller assembly is canterlevered and its is arranged to have the forces imparted to the sheet generally evenly distributed thereon.

In still other embodiments, the invention includes processes for feeding single sheets of resiliently flexible film media from a stack of such film, in the manner noted above.

BRIEF DESCRIPTION OF THE DRAWINGS

FIG. 1 is a perspective view of a laminate film which is to be transported by the apparatus according to the present invention;

FIG. 2 is a side sectional elevation of the laminate of FIG. 1 depicting certain aspects of its delamination characteristics with thicknesses of several layers exaggerated for clarity;

FIGS. 3-13 are simplified schematic illustrations of the film transport apparatus of the invention without adjacent supporting structures;

FIG. 14 is a perspective view of a film transport apparatus according to the invention;

FIGS. 15 and 16 are details of a wrapping roller device for assisting in transporting and singulating the film;

FIG. 17 is a side view of the film transport apparatus according to the invention with the roller in the discharge position including a fragmentary detail in phantom of the film transport device with the pivot arm down and the vacuum roller in the pickup position; and FIGS. 18 and 19 are respective top plan and end views with a partial section along line 19—19 of FIG. 18 of the trolley and vacuum roller assembly.

DESCRIPTION OF THE INVENTION

Referring to FIGS. 1 and 2, a laminate film 10 is shown in an exemplary embodiment as a thermal imaging film unit of the general kind comprising, for example, a thermographic film media 10 formed of a substrate 12 and an overlying disposable peel sheet 14 adhesively connected by an intermediate multicomponent image forming layer 16; such as the type of media disclosed in commonly assigned U.S. Pat. Nos. 5,155,003; and 5,200.297. Such type of media is commercially available from Polaroid Corporation. Image forming layer 16 generally comprises a pigment material such as carbon black and a binder therefor. The image forming layer may comprise a composite of several layers conducive to forming an image of desirably high resolution and optical density as a result of thermal exposure and subsequent processing, including delamination.

In the laminar composite sheet structure of FIGS. 1 and 2, the adhesive bond between substrate sheet 12 and image forming layer 16 is, in its initial unexposed state, greater than the bond strength between peel sheet 14 and image forming layer 16. As a result of thermal activation by laser energy, the bond between exposed or heated portions of image forming layer 16 and peel sheet 14 becomes stronger than the bond existing between substrate 12 and the portions of image forming layer 16. Abutting portions of image forming layer 16 are, thus, caused by thermal exposure to be adherent to peel sheet 14 at bond strengths less than and greater than the uniform bond strength between image forming layer 16 and substrate 12. As a result of laser exposure, portions of image forming layer 16 become more firmly bonded to peel sheet 14.

For purposes of the invention, it is sufficient to note that the image forming layer 16 is such that upon exposure it may be ruptured in the direction generally normal to its two surfaces along lines defined by exposure to thermal energy. Portions of the layers 16 subjected to exposure can then be separated from portions not affected by exposure to thus provide complementary images on the respective substrate and peel sheets 12 and 14 of the film 10. The complementary images 18 and 18' are represented by the broken portions of the layer 16 illustrated in FIG. 2.

To facilitate separation of the layers 12 and 14, a frangible tab 22 is provided. The adhered layers 12 and 14 are connected together by the frangible tab 22 formed near an edge 20 along a score line 24 in the substrate 12. A force f directed at the tab 22 from the free surface of the substrate 12 puts such surface of the substrate 12 into tension causing failure along the score line 24 so that the substrate 12 may be separated from the peel sheet 14, as illustrated in FIG. 2.

The apparatus of the present invention is exemplified by the schematic illustrations in FIGS. 3-13 which is a series of drawings illustrating, in sequence, the various operational steps for effecting transfer of a film medium in accordance with the present invention. FIGS. 14-19 illustrate in greater detail various aspects of the invention in a particular exemplary embodiment.

In the schematic illustrations of FIG. 3-13, a sheet feeder 26 according to an exemplary embodiment of the invention is illustrated. The feeder 26 includes a sheet retaining means or tray 28 for receiving a stack of individual sheets of thermographic media 10. The tray 28 has a pickup end 30 and a discharge end 31. The tab end 22 of the media 10 is shown at the discharge end 31 of the tray 28 and the substrate 12 is facing out. The sheet feeder 26 is adapted for feeding individual sheets of the print media 10 to a discharge loacation 33 adjacent the discharge end 31 of the tray 28. A chute, not shown, can be provided to accept the discharged sheet.

The apparatus includes a vacuum roller 34 mounted for rotation about an axle 35, and secured for translational motion on and relative to the arm 36 between the pickup position 30 and the discharge position 31. The arm is rotatable about pivot 37 between respective upper and variable lower positions 38U and 38l. The vacuum roller 34 is thus adapted to move back and forth between the pickup end 30 and discharge end 31 of the tray 28 and up and down with the arm 36 between upper and lower positions 38U and 38L.

A spring biased wrapping roller assembly 40 is carried with the vacuum roll 26 and is operatively coupled to the vacuum roller 26 for operation as will be described. The wrapping roller 40 is adapted to engage the surface of the vacuum roller and the sheet on the vacuum roller during various stages of translation and rotation thereof. In a particular arrangement the wrapping roller may be employed to assist in dislodging second or third sheets which may cling to the uppermost sheet of film medium. The wrapping roller assembly 40 may also be employed to direct the leading end of the media 10 into the discharge. The wrapping roller assembly 40 is operative, as will be described, to pinch the sheet on the vacuum roller when the vacuum is not applied to the sheet.

The vacuum roller assembly 34 includes a vacuum orifice 42 and, an interconnected radial vacuum channel 44 and an axial vacuum channel 46 which acts as a manifold within the axle 35. The orifice 42, the radial channel 44 and the axial channel 46 are connected to a source of vacuum and an appropriate control not shown in this drawing but hereinafter described with respect to the more detailed drawings.

FIGS. 3–13 illustrate the apparatus 26 in various operational positions. In a particular embodiment, the vacuum roller assembly 34 is adapted to move along a path shown by the arrows A-B-C-D, (FIG. 3) beginning at the discharge position 31 with the pivot arm 36 up at 38U. The vacuum roller assembly 34 is lowered to engage a film sheet 10 (path A) and is activated to roll along the film sheet 10 to the pickup end 30 (path B) where a vacuum is applied to the vacuum roller 26 to secure the non-tab end 22' of the film 10. The vacuum roller 34 then is activated to move along path C returning to the discharge end 31 while rolling up the film 10 thereabout. Roughly midpoint of path C, the wrapping roller 40 momentarily cammed away from the vacuum roller. At this point, the non-tab end 22' of the film 10 passes under the wrapping roller 40. It thereafter reengages the film 10 securing it to the vacuum roller 26. Vacuum is then released freeing the non-tab end 22'. When the vacuum roller 34 reaches discharge end 31, it applies vacuum to the medium 10, without touching the tab 22, at a location immediately adjacent the tab 22 rearwardly of the score line 24. The vacuum is then reapplied to secure the media to the roll 26. The vacuum roller 34 and the attached film 10 is then lifted upwardly (path D) by a lifting mechanism (not shown) so that the tab 22 has sufficient rotational clearance to clear the stack of film in the tray 28. The vacuum roll assembly 34 then rotates and the wrapping roller assembly is cammed out of the way so as to allow the film 10 to drop into a chute at the discharge location 33. In this regard, the vacuum is terminated thereby releasing the film 22 with the tab trailing.

The circumference of the vacuum roller 34 is aproximately the same as the operating length of the media 10, which is generally defined as the length from the non tab end 22' to the score line plus the width of the orifice 42. If more than one revolution of the vacuum roller is desired it may have a circumference which is an integer fraction of a number of the operating length plus the width of the orifice. By such an arrangement the vacuum roller is able to pick up both ends of the media with the same vacuum orifices.

In the arrangement illustrated, the tab end 22 of the film 10 is located near the discharge end 31 of the tray 28 with the score line 24 facing up. This arrangement has been found to be the least stressful on the film 10 during film transport. Further, it has been found to be desirable to further process the film 10 with the tab 22 at the trailing end to avoid premature delamination.

Referring in greater detail to FIGS. 3–13, the vacuum roller 34 moves along path A from the start position by lowering arm 36 downward. It then moves along path B from the discharge end 31 of the tray 28 to the pickup end 30. At this point, the vacuum orifice 42 engages the film 10 at the non-tab end 22'. A vacuum is applied to the vacuum channel 46 causing the upper film sheet 10 to cling to the vacuum roller 34. The vacuum roller 34 is then rotated (clockwise along path C) to wrap the film onto itself (FIG. 4). The spring biased wrapping roller 40 cooperates with the vacuum roller 34 by means of a cam 52 and follower 53 (not shown herein but detailed hereinafter with respect to FIGS. 15 and 16) for causing the wrapping roller 40 to overcome the bias and move radially away from the vacuum roller 34 as the non-tab end 22' of the film 10 is carried around to a position under the wrapping roller 40 (FIG. 5). Thereafter, as the vacuum roller 32 continues to rotate, the wrapping roller 40 reengages the vacuum roller 32 under spring biasing so as to maintain pressure on the film 10 to secure the film 10 against the vacuum roller 34 (FIG. 6). At about the same time, the vacuum is released from the vacuum orifice 42 to release the end 22' of the film. Ignoring FIGS. 7 and 8 for the moment, the vacuum roller 34 continues to rotate (FIG. 9). The vacuum orifice 42 then reengages the film 10 to the left of the score line 24 without touching the tab 22. The vacuum is reapplied to secure the film 10 to the vacuum roller 34 (FIG. 10). Thereafter, the vacuum roller 32 is lifted by a lifting mechanism away from the stack along path D to the elevated position 38U by the arm 36 (FIG. 11). The film is accordingly lifted by above the stack a by distance 41 sufficient to provide clearance so that the tab 22 does not touch the stack during discharge, thereby avoiding premature delamination and film scratching. The vacuum roller 34 continues to rotate with the wrapping roller 40 maintaining pressure on the film 10 to secure it into engagement with the vacuum roller 34 (FIG. 12). As the vacuum roller 34 continues to rotate (clockwise), the orifice 42 moves towards the vertical. The cam (not shown) again engages the wrapping roller 40 lifting it out of the way (FIG. 13). At the same time, the vacuum is released from the orifice and the film 10 is directed into the discharge 33 (FIG. 13).

If one or more additional film sheets cling to the film sheet 10 carried by the vacuum roller 34, an alternative sequence, as illustrated in FIGS. 7–9, may be introduced into the operation to dislodge such sheets. As previously noted, after the non-tab end 22' of the film 10 moves beyond the wrapping roller 40 (FIG. 6), the roller 40 engages the film. Rather than releasing the vacuum at this point, as previously described, the vacuum may be maintained, and the vacuum roller's rotational and translational direction may be reversed, as shown in FIGS. 7 & 8. The counterrotation of the roller lifts the wrapping roller by means of a cam. Since an extra sheet (e.g., 10') is clinging to the sheet 10 carried by the vacuum roller 34, said extra sheet is not secured in position by the vacuum, and it is thus free to slip. As the vacuum roller 34 is reversed, sufficient relative motion may be induced between the clinging film 10' and the sheet 10 wrapped on the roller 34 to cause a release of the various forces between the sheets 10-10'. Specifically, the stored energy put into the clinging sheet by rolling is released and it overcomes the clinging forces. Since the wrapping roller 40 has moved away from the vacuum roller 34, the clinging sheet 10' breaks away (FIG. 8). The film 10, being a relatively stiff material, tends to rapidly separate once the static forces have been relieved. The vacuum roller 34 may be reversed while maintaining vacuum by appropriate control. Thereafter, the clockwise rotation of the vacuum roller 34 may be resumed with a singulated sheet of film 10 attached thereto (FIG. 9) and the wrapping roller engages the wrapped sheet 10.

FIGS. 14–18 illustrate in greater detail an exemplary sheet feeder 60 according to the present invention in greater detail. The apparatus comprises a base member 62 supporting a sheet retaining means or tray 64 having a pickup end 66 and a discharge end 68. The apparatus 60 also has a discharge channel 70 formed between respective inboard and outboard deflectors 71 and 72. One or more sheets 10 of film material may be located in the tray 64 with the substrate 12 facing outwardly and the tab 22 positioned at the discharge end 68.

The letter designations L, R and C following certain reference numbers are used to denote the location of the corresponding element. In order to simplify the discussion, such letter designations are not used when the position of the element is not relevant.

As previously described, the feeder 60 employs a vacuum roller assembly or means 32. In the illustrative embodiment, the vacuum roller means 32 comprises a plurality of relatively narrow wheel members or wheels 76L, 76R and 76C mounted on a common shaft 78 (FIGS. 18–19). In the exemplary embodiment, three wheel members have an elastomeric coating 77, e.g., to enhance rolling friction, and the wheel may be a light weight plastic (e.g., ABS, PVC, etc.), formed with a rim, open spokes and a hub. In the exemplary embodiment, three wheel members are disposed on the shaft 76L, 76R and 76C. Outboard wheels 76L and 76R are disposed near the corresponding left and right (L and R) sides of the tray 64, and the center wheel member 76C is located more or less centrally (C) of the tray 64, as illustrated. The shaft member 78 is formed with the axial chamber 46 therein. A plurality of radial members 80L, 80R and 80C extend from the shaft 78 and are shown aligned in a direction transverse of the transport direction 50 (FIG. 18). Each of the radial members 80 is formed with the radial passage or chamber 44 (FIGS. 15 and 16) therein. The radial members 80 are connected to the shaft 78 at their respective proximal ends 81 and are in flow communication with the fluid channel 46. The end of each radial member 80 has a bellows or suction cups 82 mounted thereon at the free or distal end 83. The flexibly resilient cups 82 are adapted to softly engage the film sheet 10. Each bellows 82 has a central aperture 42 in communication with the radial passage 44.

In the arrangement illustrated, the outboard radial members 80L and 80R are mounted outboard of the corresponding wheel members 76L and 76R. The central radial member 76C may be mounted centrally of the central wheel member 76C through an aperture 86 formed in an outer rim portion 88 thereof. Alternatively, the central radial member 80C may be mounted adjacent the central wheel 76C. When the wheels 76 are in the pickup position 66, as illustrated in phantom (FIG. 17), the suction cups 82 are in engagement with the film 10 for initiating the transport thereof.

The shaft 78 is carried at its proximal end by a trolley 90 mounted on the pivot arm assembly 92 for translational motion between the pickup and discharge positions 66 and 68. The pivot arm 92 is an "L" shaped member having an elongated lift arm portion 94 and a short leg 96. The pivot arm 92 is secured by the leg 96 for pivotal movement at a pivot 98 attached to the base member 62 near the pickup end of the tray 64. The lift arm 94 extends generally in the sheet feed and trolley transport direction 50 and has a free end 100 located near the pickup end 66 of the tray 64. A lift assembly 102 engages the free end 100 for raising the lift arm 94 when the vacuum roller assembly 34 nears the discharge end 68. The lift assembly 102 has a lifter 104 that engages a bearing 105 on the free end 100 of the lift arm 94. The lifter 104 has a lower rest position 106 near the base plate 62 and an elevated position 108 near the upper end of the lift assembly 102. The lift assembly 102 includes a motor driven rack and pinion 109.

When at the rest position 106, the lifter 104 is separated from the bearing 105 on the lift arm 94 by a space 112 (FIG. 17) which may vary with respect to the number of sheets of film in the tray 64. Thus, when the lift assembly 102 is at the rest position 106, the lift arm 94 is supported between the vacuum roller 32 and the pivot 96. Accordingly, the lift arm 94 is free to assume a rest position corresponding to the height of the stack which decreases as the media supply decreases.

When the lifter 104 is in the elevated position 108, such as when the roller assembly is at the discharge end, the lift arm 94 is fully elevated and the vacuum roller assembly 34 is suspended above the tray 64. This feature is provided to facilitate clearance of the tab 22 from the remaining sheets during discharge of the transported sheet 10 into the discharge slot 70 (see FIGS. 11 and 12). As noted, such lifting tends to avoid partial delamination that might occur if the tab is nicked during discharge and avoids film scratching.

The pivot arm assembly 92 has a pair of bearing supports 112 which extend in the inboard direction. A rod or shaft 116 is carried in the supports 112 at its opposite ends. The shaft 116 extends parallel to the lift arm 94 generally in the transport direction 50.

The trolley 90 comprises a U-shaped member 120 (FIG. 19) which has a pair of upstanding respective inboard and outboard sidewalls 121 and 122 and an interconnecting lower wall 123. The inboard sidewall 121 has a pair of spaced apart trolley supports 124 formed with aligned apertures 125. A linear bearing 126 which extends in the transport direction 50 is located in each aperture 125. Linear bearing 126 is sleeved onto the shaft 116 and allows the trolley 90 to move between the pickup and discharge positions 66 and 68.

The vacuum shaft member 78 is rotatably secured in aligned apertures 132 in side walls 121 and 122 and it is connected by a fluid coupling 134 to a vacuum line 136 and an appropriate vacuum control hereinafter described. A reversible motor 138 is coupled to the shaft 78 by a conventional gear set 139 shown in FIG. 17 so that the motor can rotate the shaft 78. In a particular embodiment, the motor 138 is a DC motor with an encoder 140. The motor 138 may position the roller assembly to any angular orientation relative to the shaft, depending upon the number of counts applied to the motor from a reference of a control system (not shown) which is operable to control the sheet feeder consistent with the operation thereof described herein. To facilitate angular control of the rotation of the roller assembly, there is provided in one embodiment, an encoder disk 141 (FIG. 17) having a slit 142 is mounted on shaft 78. An optical sensor 143 is mounted on the trolley and aligned with the disk 141 which is operationally coupled to the motor encoder to establish an angular reference (FIGS. 17 and 19).

When the pivot arm assembly 92 is lowered and the wheels 76 engage the film 10 the motor 138 is activated driving gear set 139 and interconnected shaft 78 causing the vacuum roller assembly 32 to move. Translation of the trolley occurs because the friction between the wheels and the sheet. When the pivot arm 92 is raised as discussed earlier, the motor 138 only rotates the wheels 76 to various angular positions. It will be understood that the trolley will not translate unless there is friction between the wheels and the sheet. Thus, one motor controls translation of the trolley 90 and the angular positioning of the vacuum rolls 76.

Sensors 144 mounted on the pivot arm 94 are operationally coupled to the encoder 140 and may be employed near the pickup and discharge positions to sense the position of the trolley 90 on the lift arm 92. Using appropriate software control responsive to the sensors 144 and an interrupt flag (not shown), the motor 138 may be stopped at precise locations at either end.

The vacuum roller assembly 34 has a center of gravity more or less localized near the inboard wheel 76R (FIG. 19). According to the invention, means is provided in order to more evenly distribute the weight of the vacuum roller assembly 34 on the film among the vacuum wheels 76L, 76R and 76C. Referring to FIG. 17, a spring arm 145 is pivotally mounted at pivot 146 to the upstanding outboard sidewall 122 for positionment above the lift arm 94. The spring arm 145 has a roller bearing 147 for engaging longitudinally extending bearing surface 148 on the lift arm 94, as illustrated. A pin 149 is secured to a free end of the spring arm 145. An anchor pin 150 is secured to the outboard side wall 122. A spring 151 interconnects the pins 149 and 150. The spring 15 1 biases the trolley 90 by urging the spring arm 145 in a downward direction to thereby positively urge the outboard side 122 of the trolley 90 upwardly and thus urge the vacuum roller assembly 36 in a downward direction to thereby redistribute the downward force more evenly across the film 10.

When the vacuum roller assembly 34 is lifted at the discharge position 68, the downward force at the center of gravity (and the spring arm 145) tends to rotate the vacuum assembly 34 counterclockwise (FIG. 19). This can disorient the film during discharge. Accordingly, an anti-rotation feature is provided.

As illustrated in FIGS. 17 and 19, the lift arm 94 has a downward facing stop surface 152 located on the underside near the discharge end 68. The trolley has an anti-rotation surface 154 extending inwardly from the side wall 122 for engaging the stop surface 152 when the trolley 90 is located at the discharge end 68. The surfaces 152 and 154 are slightly spaced apart (FIG. 19). When the lift arm 94 is raised, the anti-rotation surface 154 abuts the stop surface 152 whereby the trolley 90 and vacuum roller assembly 34 remain more less level.

As illustrated in FIG. 14, a vacuum controller system forming part of the overall system control is provided for the vacuum roller assembly 34 comprising a vacuum pump 160, a sheet feeder release valve 162, a vacuum pressure sensor 164 and a sheet feeder select valve 166. An air filter 168 may also be employed. The pump 160, the sheet feeder release valve 162, the pressure selector 164, the feeder select valve 166 and the air filter 168 are serially connected by a vacuum line 136 to the fluid coupling 134 which is fluid communication to the axial vacuum line 46, the radial vacuum line 44 and the bellows 80.

The sheet feeder release valve 162 is selectively responsive to the angular position of the vacuum roller 34 by suitable switches and control electronics (not shown) in the control system for opening and closing the vacuum circuit to the vacuum line 136 when the vacuum orifice 42 is at selected angular positions as earlier discussed in FIGS. 3–13. The vacuum pressure sensor 164 is operative to indicate that sufficient vacuum pressure is available for normal operation; to confirm position initial engagement of the vacuum roller 34 with the sheet; and to monitor continued engagement therewith during feeding. Failure or loss of vacuum may be sensed by a suitable sensor (not shown) and forming part of the vacuum control to reset the system in a known manner.

The sheet feeder select valve 166 is operative to couple the vacuum line 136 to the feeder assembly 60 illustrated herein, or to an adjacent feeder assembly (not shown) in the event that a dual feed is desired. The air filter 168 provides appropriate air filtration. The vacuum pump 160 operates likewise in a known manner to draw vacuum.

As shown in FIGS. 15, 16, 18 and 19, the shaft 78 has a pair of spaced apart cam members 180L–180R coaxially attached thereto. Corresponding cam follower linkage assemblies 182L–182R have a segment 193 with a shaft portion 194 that is pivotally secured to an interior facing surface of the end plate 195 at the left end. The other shaft portion 194 of the linkage assembly 182 R is pivotally mounted to a bushing 197 extending from the trolley. The end plate 195 is connected together by a bar to the trolley for rigidity and has a configuration as shown in the drawings. The end plate 195 is rotatably secured to the shaft 78 so as to allow rotation of the latter with respect thereto. The common shaft 184 extends parallel to the vacuum roller shaft 78. The common shaft 184 carries a plurality of wrapping roller elements 40L, 40R and 40C, each of which engage the outer rim portions 88 of the corresponding vacuum wheels 76L, 76R and 76C as will be described. A pair of torsion springs 196 is provided. One spring 196, as shown in FIGS. 15 and 16, is mounted on the shaft 194 and has one end 196a thereof connected to a portion (not shown) of the plate 195 and the other end 196b engaging a shaft 198 of the cam roller 200 of the linkage 180 L. The other torsion spring is mounted on a shaft 194 from the other linkage 180 R and has one end engaging the bushing 197 and the cam roller shaft of the other cam roller of the opposite linkage. The springs function to urge or bias the linkages so that they rotate and thereby urge the wrapping rollers into engagement with the rollers 76. Each cam member 180 is designed to have a high point or maximum radius in alignment with the radial members 80 so that as the film 10 is carried towards the wrapping roller 40, it is lifted away from the vacuum wheels 76 to effect passage of the leading end of the picked up sheet therebeneath. Continued rotation of the shaft will rotate the cam so as to allow the torsion spring to drive the linkage in the opposite direction so that the shaft 184 and its associated wrapping rollers can move toward the rollers 78 and act to pinch the rolled sheet thereto. It will be appreciated therefor that the cam is formed so that the wrapping rollers can move into and from engagement with the roller and sheets as noted earlier with respect to their described operation in FIGS. 3–13.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. An apparatus for sheetwise feeding in a selected direction of sheet travel to discharge sheets of a laminated thermographic print media formed of a thermally sensitive substrate and an overlying laminated disposable peel sheet joined to the substrate by an intermediate multicomponent, adhesive, image forming layer, said substrate having a frangible tab formed along a score line in a free surface of the substrate adjacent the marginal edge comprising:

a sheet retaining means having an open top and opposed pickup and discharge ends extend transverse of the direction of sheet travel for receiving a stack of sheets therein with the free surface of the substrate facing outwardly and the tab at the discharge end and extending in the transverse of the direction of sheet travel;

vacuum roller means reciprocatable between the pickup and discharge positions corresponding to the opposite ends of the sheet retaining means including sheet engaging vacuum means disposed transverse to the direction of sheet travel and operable for applying vacuum for engaging the sheet near the pickup position and rolling the sheet thereabout to a selected first angular position in the direction of travel and for releasing the vacuum at the end at said first angular position, and thereafter applying vacuum for engaging the sheet near the tab end and carrying the sheet thereabout to a second selected angular position near the discharge position and releasing the sheet as the roller means approaches the discharge position;

wrapping roller means engaging the sheet on the vacuum roller at least between the first and second angular locations so as to hold the sheet while the vacuum is released;

means for selectively applying vacuum to the vacuum means for engaging and disengaging the ends of the sheet at the respective first and second locations; and lifting means operable for lifting the vacuum roller means and the sheet from the stack so as to avoid scratching the sheet on the stack.

2. The apparatus of claim 1 wherein the vacuum roller means comprises a shaft member transverse of the direction of sheet travel and a plurality of vacuum rollers disposed on the shaft.

3. The apparatus of claim 2 wherein the vacuum roller means further comprises a central shaft having a central passageway and a plurality of radially extending vacuum applying members extending from the central shaft, each having a radial channel in communication with the central passageway so as to allow application of vacuum to the sheet.

4. The apparatus of claim 3 wherein each radial member has a free end including a resilient suction cup attached thereto in communication with a corresponding radial passageway for providing compressible engagement with the sheet.

5. The apparatus of claim 3 wherein each of the vacuum rollers is spaced from each other to prevent the sheet end from bowing between the cups while vacuum is applied to the sheets.

6. The apparatus of claim 3 wherein at least one suction cup is positioned adjacent a corner of the sheet being fed.

7. The apparatus of claim 3 wherein one each of the radial members is located near each corresponding marginal edge of the sheet.

8. The apparatus of claim 7 wherein the vacuum roller means comprises a plurality of rollers, one each disposed on the central shaft for engagement with marginal edges of the sheet.

9. The apparatus of claim 8 wherein the rollers are mounted on the shaft adjacent each of the radial members.

10. The apparatus of claim 8 wherein at least one central roller is in alignment with the corresponding centrally located radial member.

11. The apparatus of claim 3 wherein at least one of the radial members is located centrally of the sheet.

12. The apparatus of claim 11 further comprising at least one roller disposed centrally for engagement with a central portion of the sheet.

13. The apparatus of claim 1 wherein the wrapping roller means includes camming means for lifting the wrapping roller away from engagement with the roller means.

14. The apparatus of claim 13 wherein the camming means is operative for moving the wrapping roller out of engageent with the roller means when the sheet engaging vacuum means approaches the wrapping roller near the first angular position.

15. The apparatus of claim 1 wherein the lifting means comprises a pivot arm located about an axis transverse to the direction of sheet travel and at the discharge end and having a free end adjacent the pickup end.

16. The apparatus of claim 15 wherein the lifting means further comprises a lifting member located for engagement with the free end for lifting the pivot arm.

17. The apparatus of claim 1 further comprising trolley means for supporting the roller means and being reciprocal between the pickup and discharge positions.

18. The apparatus of claim 17 further comprising a pivot arm secured about an axis transverse to the direction of travel near the discharge position and having a free end proximate the pickup position.

19. The apparatus of claim 18 wherein said pivot arm includes an elongated support extending along the direction of travel from the pickup position to the discharge position and said trolley means is mounted for reciprocatable motion on the support between the pickup and discharge positions.

20. The apparatus of claim 18 wherein the trolley is rotatably mounted about an axis generally in the direction of travel on the pivot arm.

21. The apparatus of claim 20 further including biasing means between the trolley and the pivot arm for rotatably biasing the roller means in the direction of the free surface of the sheet for providing a distribution of forces between the roller and the sheet.

22. The apparatus of claim 20 wherein the pivot arm has an inboard edge and an outboard edge, and the trolley comprises a member having an inboard wall portion suspended from the pivot arm near the inboard edge.

23. The apparatus of claim 22 wherein the member has a U-shape.

24. The apparatus of claim 22 wherein biasing means in the form of a spring loaded pivot member engages the outboard edge of the track.

25. The apparatus of claim 22 wherein the vacuum roller means further comprises a cantilever member having a proximal end attached to the trolley and a distal end remote therefrom, said cantilever member extending transverse of the direction of travel of the sheet.

26. The apparatus of claim 25 wherein the cantilever member is rotatably secured in the trolley.

27. The apparatus of claim 1 further including drive means operatively coupled to the roller means for selectively positioning the roller means between the pickup and discharge positions.

28. The apparatus of claim 27 wherein the drive means comprises a motor.

29. The apparatus of claim 28 wherein the motor includes an encoder.

30. The apparatus of claim 29 further including a reference detector operatively coupled by electronic means to the encoder for establishing a reference.

31. The apparatus of claim 1 wherein means for selectively applying vacuum has a single row of vacuum orifices.

32. The apparatus of claim 31 wherein the vacuum orifices are aligned transverse to the direction of sheet travel.

33. An apparatus for feeding sheets to a sheet discharge position, said apparatus comprising:

sheet retaining means having first and second opposite ends respectively located remote and proximate the discharge position, said ends corresponding to the first and second ends of the sheet and being adapted for receiving a stack of sheets therein;

sheet engaging vacuum applying means reciprocatable between the first and second positions corresponding to the ends of said sheet retaining means, and including sheet engaging vacuum roller means for engaging the sheet by applying vacuum near the first end and rolling the sheet thereabout to a selected first angular position and for releasing the first end at said first angular position by releasing the vacuum, and thereafter applying vacuum to and adjacent the second end of the sheet as said roller means approaches the second end for carrying the sheet thereabout to a selected second angular position and releasing vacuum on the sheet at said second angular position as said roller means approaches said second end so as to allow the sheet to be removed from said retaining means; and, said sheet engaging and vacuum roller means includes means operable for selectively applying vacuum to said roller means for effecting engagement and release of the respective first and second sheet ends at said corresponding first and second angular positions.

34. The apparatus of claim 33 wherein the sheet engaging vacuum roller means includes a single row of vacuum orifices.

35. The apparatus of claim 34 wherein said vacuum roller means has a circumference correlated to the length of the sheet so as to allow said row of orifices to engage both the first and second ends of the sheet.

36. The apparatus of claim 33 further including:

wrapping roller means operable for engaging the sheet at selected locations of angular rotation of said vacuum roller means between the first and second angular positions; and, means for reversing the direction of movement of said vacuum roller means with respect to the sheet feeding direction when said roller means is between said selected positions.

37. The apparatus of claim 33 wherein said wrapping roller means engages the sheet at selected locations for directing the sheet toward a discharge position.

38. The apparatus of claim 37 wherein said wrapping roller means engages the sheet on said vacuum roller means at selected locations between the first and second positions for urging the sheet thereagainst in closely conforming relation.

39. A method of feeding at least a single sheet from a stack of sheets in a selected direction of sheet feed travel from a pickup position to a discharge position, said method comprising the steps of:

retaining a stack of sheets having a pickup end portion and a discharge end portion at the respective pickup and discharge positions and the portions extending transversely to a sheet feeding direction of travel;

engaging a top sheet of a stack adjacent the pickup end portion with a vacuum roller means and applying vacuum by a source thereof so as to secure the sheet on the roller means;

rotatably advancing the vacuum roller means, while engaging the top sheet, in the sheet feed travel direction so as to roll the sheet thereabout to a selected first angular position of the roller means;

releasing the pickup end portion from the roller means by releasing the vacuum thereon at the first angular position;

applying vacuum adjacent the discharge end portion of the top sheet as roller means is advancing in the sheet feed travel direction so as to engage the sheet adjacent the discharge end portion thereof and rolling the sheet thereabout to a second selected angular position of the roller means adjacent the discharge position; and, releasing the sheet from the roller means at the second angular position by releasing the vacuum source as the roller means approaches the discharge position to allow discharge of the sheet from the roller means.

40. The method of claim 39 further including the step of: lifting the roller means and the wrapped sheet relative to the stack adjacent the discharge position so that the roller means and the sheet can clear any obstructions to advancement thereof.

41. The method of claim 39 further including the steps of: providing a generally uniform distribution of forces of the vacuum roller means on the top sheet of the stack so as to avoid having the top sheet shift laterally.

42. The method of claim 39 wherein said step of applying a source of vacuum includes the use of a single row of vacuum orifices on the vacuum roller means to engage both the pickup and discharge end portions of the sheet during advancement of the roller means in the sheet feeding direction.

43. The method of claim 42 further including the steps of: providing a generally uniform distribution of forces of the vacuum roller means on the top sheet so as to insure engagement of the orifices with the top sheet.

44. The method of claim 39 further including the step of: applying a wrapping roller to the sheet on the roller means so as to assist in keeping the sheet on the roller means during a portion of the travel of the roller means in the sheet feeding direction and for directing the pickup end portion towards the discharge position.

45. The method of claim 39 wherein each of the sheets of the stack is a laminated thermographic print medium comprising a thermally sensitive substrate and an overlying disposable peel sheet joined together by an intermediate multicomponent, adhesive, image forming layer, and wherein the substrate has a frangible tab formed along a score line in one surface of the substrate adjacent a marginal edge thereof; the sheets have a tendency to cling together.

* * * * *